United States Patent
Brownbridge et al.

(10) Patent No.: US 6,981,666 B2
(45) Date of Patent: Jan. 3, 2006

(54) TITANIUM DIOXIDE SLURRIES

(75) Inventors: Thomas Ian Brownbridge, Oklahoma City, OK (US); Jeffrey Austin Engle, Oklahoma City, OK (US)

(73) Assignee: Kerr-McGee Chemical, LLC, Oklahoma City, OK (US)

( * ) Notice: Subject to any disclaimer, the term of this patent is extended or adjusted under 35 U.S.C. 154(b) by 337 days.

(21) Appl. No.: 10/614,424

(22) Filed: Jul. 7, 2003

(65) Prior Publication Data

US 2005/0074379 A1    Apr. 7, 2005

Related U.S. Application Data

(62) Division of application No. 10/400,376, filed on Mar. 27, 2003, now Pat. No. 6,699,317.

(51) Int. Cl.
B02B 5/02    (2006.01)

(52) U.S. Cl. ..................... 241/101.2; 241/60

(58) Field of Classification Search ............. 241/101.2, 241/21, 60, 65
See application file for complete search history.

(56) References Cited

U.S. PATENT DOCUMENTS

| | | | |
|---|---|---|---|
| 4,115,144 A | 9/1978 | Chambers et al. | |
| 4,288,254 A | 9/1981 | Gladu | |
| 4,427,451 A | 1/1984 | Baloga | |
| 4,952,317 A | 8/1990 | Culkin | |
| 5,622,628 A | 4/1997 | Trendell et al. | |
| 5,908,498 A | 6/1999 | Kauffman et al. | |
| 6,126,915 A | 10/2000 | Tunashima et al. | |
| 6,699,317 B1 * | 3/2004 | Brownbridge et al. | 106/436 |

* cited by examiner

Primary Examiner—Derris H. Banks
Assistant Examiner—Faye Francis
(74) Attorney, Agent, or Firm—Law Office of Stanley K. Hill, PLC

(57) ABSTRACT

Improved methods for producing titanium dioxide slurries. The output from a micronizer is passed through a condenser to condense the steam and form an aqueous slurry of titanium dioxide, which can in most cases then be further concentrated as desired or which can be sold or used without further concentration, instead of passing the micronizer output to apparatus for separating the TiO2 from the steam, as is currently practiced in the art. The resultant slurry from the condenser is in a further refinement preferably sent to an agitated storage tank together with dispersant and anti-settling compounds to aid in preventing settling of the titanium dioxide solids out of the slurry. To help facilitate condensation of the steam/pigment mixture sent to the condenser, a portion of the condensed slurry is in yet a further refinement pumped from the slurry storage tank to a heat exchanger. The output from the heat exchanger is then fed to the condenser to facilitate the condensing of the steam in the condenser. The temperature and volume (flow) of cooled condensate to the condenser are set to match the amount of steam and its temperature so as to ensure that substantially all of the steam and contained pigment are collected from the condenser.

10 Claims, 1 Drawing Sheet

TITANIUM DIOXIDE SLURRIES

The application is a divisional of U.S. patent application Ser. No. 10/400,376, filed Mar. 27, 2003 now U.S. Pat. No. 6,699,317, which is incorporated herein by reference.

FIELD OF THE INVENTION

The present invention generally relates to slurries of titanium dioxide. More specifically, the present invention relates to concentrated slurries of titanium dioxide and methods for producing concentrated slurries of titanium dioxide.

BACKGROUND

Titanium dioxide ("$TiO_2$") has many known uses in industry. For example, $TiO_2$ is used as a pigment for many paints. It is also used in other applications such as paper making, plastics applications and coating compositions.

Methods for producing $TiO_2$ are also known in the art. $TiO_2$ is generally produced by hydrolyzing an aqueous solution of titanium sulfate and calcining the hydrolyzate at about 750–1000° C., or oxidizing titanium tetrachloride ("$TiCl_4$") at elevated temperatures followed by cooling at temperatures below about 600° C. The $TiO_2$ thus prepared is dry or wet ground and then dry milled. One method of dry milling is accomplished by utilizing a micronizer (also sometimes referred to as a fluid energy mill). Utilizing a micronizer typically involves introducing dry $TiO_2$ pigment and a fluid, typically steam, into the micronizer. The output of the micronizer typically contains from about 20 percent of $TiO_2$ to about 50 percent of $TiO_2$, with substantially all of the remaining output composition comprising steam.

In most pigment manufacturing operations the $TiO_2$ in the output from the micronizer is separated from the steam, cooled and packaged as a dry particulate. This finished $TiO_2$ pigment can then later be formed into an aqueous slurry for the production of paints, coatings, and the like. In one process for preparing such aqueous slurries of $TiO_2$, the finished $TiO_2$ pigment is added to a water-dispersant package in a batch mixer having a high shear agitator. The slurry is then stirred until the degree of dispersion required is achieved in the slurry. Typically the dried $TiO_2$ pigment is shipped to a customer and the slurry preparation is performed by the customer. However, it is becoming more and more common for the producer of the $TiO_2$ pigment to produce and sell the pigment in a slurry form, and higher solids (i.e., more concentrated) slurries containing from 60 to 80 percent solids and higher, more particularly comprising at least about 60 weight percent of titanium dioxide, preferably at least about 65 and more preferably at least about 76 weight percent of titanium dioxide, are in increasing favor.

To separate the $TiO_2$ in the micronizer output from the steam in the micronizer output, the output of the micronizer is typically introduced into a cyclonic gas-solids separator (or cyclone), wherein solid $TiO_2$ product falls to the bottom of the cyclone and is removed in the underflow while the steam typically exits from the top in the overflow. The solid $TiO_2$ product is then sent to a silo for packaging and shipping or to be used to produce a slurry as described above. The steam that exits from the cyclone is sometimes referred to as micronizer tailings. These micronizer tailings can be processed to produce $TiO_2$ slurries using known methods such as the one taught in U.S. Pat. No. 4,427,451 issued to Baloga.

SUMMARY OF THE INVENTION

The present invention relates in a first aspect to an improved method of producing titanium dioxide slurries. According to the present invention in this first aspect, the output from a micronizer (that is, substantially steam and TiO2) is passed through a condenser to condense the steam and form an aqueous slurry of titanium dioxide, which can in most cases then be further concentrated as desired or which can be sold or used without further concentration, instead of passing the micronizer output to apparatus for separating the TiO2 from the steam, as is currently practiced in the art.

The resultant slurry from the condenser (hereinafter also referred to as the "condensate slurry" is in a further refinement preferably sent to an agitated storage tank together with dispersant and anti-settling compounds to aid in preventing settling of the titanium dioxide solids out of the slurry, with the amounts of dispersant and anti-settling compounds added being based on the weight of titanium dioxide fed to the micronizer. To help facilitate condensation of the steam/pigment mixture sent to the condenser, a portion of the condensed slurry is in yet a further refinement pumped from the slurry storage tank to a heat exchanger. The output from the heat exchanger is then fed to the condenser to facilitate the condensing of the steam in the condenser. A secondary benefit of this re-circulation of condensate is to keep the condenser from fouling due to deposits of titanium dioxide on the internal plates or tubes of the condenser and thereby lose cooling efficiency. The temperature and volume (flow) of cooled condensate to the condenser are set to match the amount of steam and its temperature so as to ensure that substantially all of the steam and contained pigment are collected from the condenser.

To start the operation without a supply of condensate, sufficient deionized water is fed to the condenser until the level of condensate in the storage tank is adequate to allow for the re-circulation loop described above to be put into operation. At that point the use of deionized water is discontinued. While this results in some initial dilution of the condensate, the amount added is small and would not be expected to significantly impact the overall operation.

The present invention relates in a second aspect to a process of making a concentrated titanium dioxide slurry containing at least about 60, preferably at least about 65 and more preferably at least about 76 weight percent of titanium dioxide in an aqueous medium, wherein a condensate slurry prepared as described above is further concentrated as to the titanium dioxide component of the condensate slurry. Various apparatus and methods are known which can be used for accomplishing the further concentration of the condensate slurry, for example, by membrane filtration as shown by U.S. Pat. Nos. 4,952,317 and 5,014,564 to Culkin and by U.S. Pat. No. 5,622,628 to Trendell et al. The present invention relates in its final aspect to the concentrated slurries produced by such methods.

BRIEF DESCRIPTION OF THE DRAWING

The present invention is illustrated by way of example only in the accompanying drawing, in which like references indicate similar elements. FIG. 1 is not intended to be limiting of the invention's scope as defined in the claims below.

DETAILED DESCRIPTION OF PREFERRED EMBODIMENTS OF THE INVENTION

Figure 1:
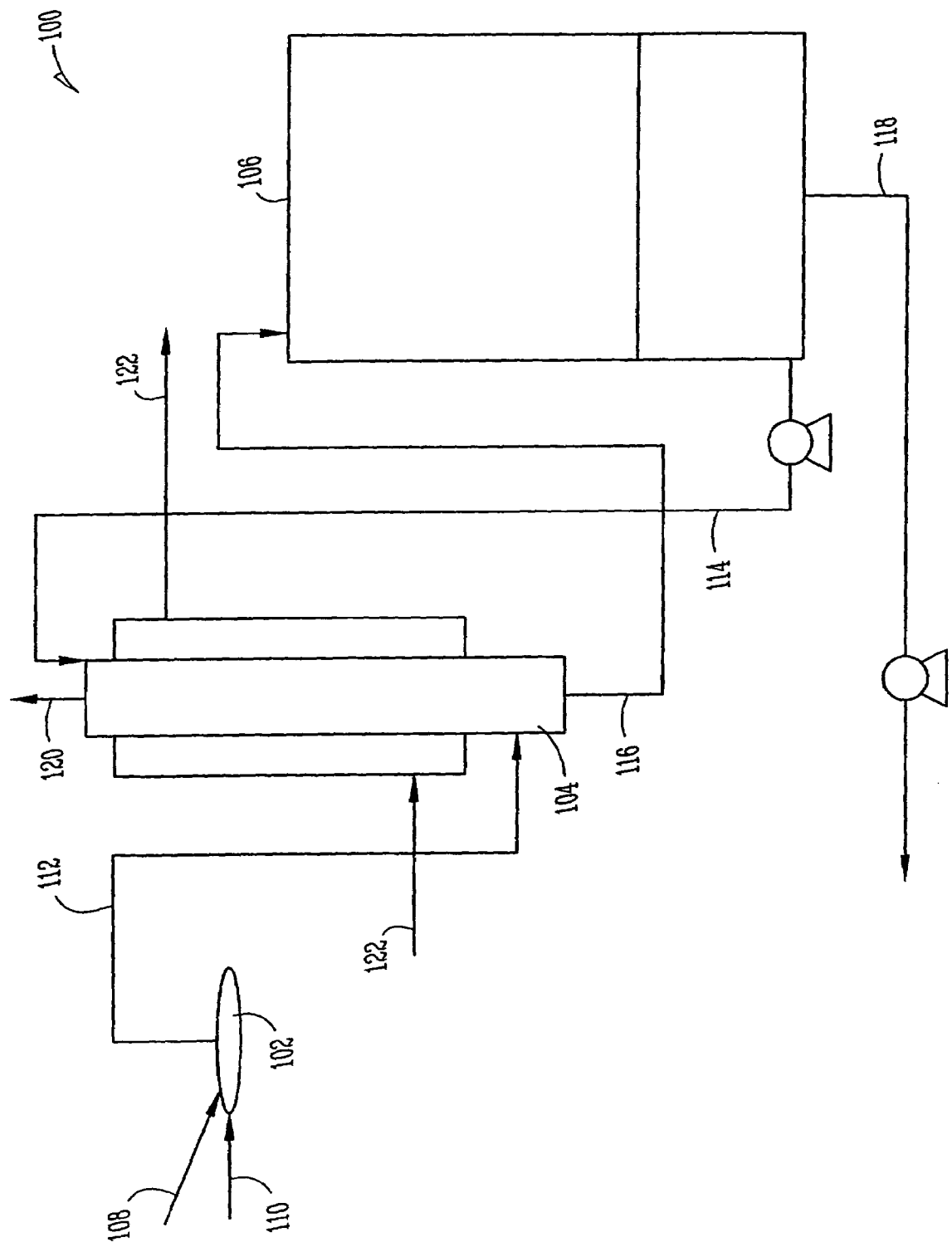
FIG. 1 thus illustrates one preferred way to carry out the present invention, though other ways of practicing the invention are within the capabilities of those skilled in the art and so

Referring now to FIG. 1, the apparatus 100 comprises a micronizer 102, a condenser 104, and a storage tank 106. Titanium dioxide 108 and steam 110 are introduced into the micronizer 102. Micronizers useful in the present invention and how they work are known in the art. Generally, steam is added to the $TiO_2$ to provide energy sufficient to maintain particle-to-particle separation and good grinding efficiency. The output of the micronizer is a mixture of $TiO_2$ and steam, having a $TiO_2$ content of from about 25 percent to about 50 percent by weight. The temperature of the micronizer output is sufficiently high to prevent the mixture from condensing, typically being at least about 300° F. and preferably being at least about 400° F. Typically, the temperature of the micronizer output mixture is no more than about 600° F. and preferably no more than about 500° F.

The micronizer output (that is, the $TiO_2$/steam mixture) is fed to condenser 104 by any appropriate means known in the art as indicated in FIG. 1 by the arrow 112. Inside the condenser 104, the $TiO_2$/steam mixture is combined with an aqueous $TiO_2$ slurry, with the aqueous $TiO_2$ slurry being introduced into the condenser 104 by any appropriate means known in the art. Preferably, the $TiO_2$ slurry will be introduced (that is, recycled) into the condenser 104 from the storage tank 106 via a recycle line 114 as shown in FIG. 1. The condenser 104 may have a vent 120 as is known in the art. Additionally, the condenser may utilized cooling water 122 as is known in the art to maintain a desired temperature in the condenser 104.

The percentage by weight of $TiO_2$ in the $TiO_2$/steam mixture and the percentage by weight of $TiO_2$ present in the added slurry are preferably approximately the same. The temperature of the slurry added to the condenser 104 is lower than the temperature of the micronizer output added to the condenser 104. The volume and temperature of the added slurry are sufficient to condense substantially all of the $TiO_2$/steam mixture. It will be appreciated that the volume and temperature of the added slurry that is needed to be sufficient to condense substantially all of the $TiO_2$/steam mixture will vary depending on the volume and temperature of $TiO_2$/steam mixture to be condensed. However a sufficient volume and temperature can be determined without undue experimentation.

The condensed $TiO_2$/steam mixture is combined with the added slurry in the condenser 104 to produce a resulting condensate slurry. The resulting slurry will generally have a $TiO_2$ content of at least about 25 percent by weight and preferably at least about 30 percent by weight. In one preferred embodiment of the present invention, the resulting slurry contains at least about 40 percent by weight of $TiO_2$. The resulting slurry can then be transported to the storage tank 106 by any appropriate means known in the art as indicated in FIG. 1 by the arrow 116.

In a preferred embodiment, some of the slurry stored in the storage tank 106 is recycled to the condenser 104 as described above. The slurry in the storage tank 106 that is not recycled can be transported by any appropriate means known in the art as indicated in FIG. 1 by arrow 118 to be used, for example, as a precursor slurry to a final slurry production process wherein the precursor slurry is made suitable for a customer's intended use. A slurry intended for use in the manufacture of latex paints would, for example, be made by further concentrating the precursor slurry through any known means to at least about 60 weight percent of titanium dioxide, e.g., by membrane filtration using apparatus and process as shown by U.S. Pat. Nos. 4,952,317 and 5,014,564 to Culkin and by U.S. Pat. No. 5,622,628 to Trendell et al. Other applications may seek still higher concentrations on the order of at least about 65 percent to about 76 percent and greater; those skilled in the art will however be well able to make final slurry products in a variety of concentrations and for a variety of applications, starting from the slurries enabled by the present invention.

The temperature and volume of the recycled slurry can be controlled by any means known in the art so that it meets the temperature and volume requirements described above. For example, the temperature of the slurry in the storage tank 106 may be higher than the desired temperature of the slurry to be recycled to the condenser 104. Accordingly, when the slurry to be recycled leaves the storage tank 106 it may be cooled via any appropriate method known in the art before it is added to the condenser 104. Additionally, the volume of slurry that is recycled from the storage tank 106 can be controlled by any means known in the art such that the recycled slurry will have a $TiO_2$ content that is approximately the same as the $TiO_2$ content of the micronizer output that is fed to the condenser 106.

The present invention is further illustrated in its various aspects in the examples which follow:

EXAMPLE 1

A micronizer with an internal diameter of 4 inches and flat parallel plates mounted horizontally was assembled so that both steam and pigment fed to the micronizer exited from the top side of the unit. Piping connected to the top of the micronizer thereafter conducted the steam-pigment mixture to a condensing unit. To aid in condensing the steam-pigment mixture a small amount of water was added to a holding tank into which the steam-pigment mixture was collected. A pump connected to the holding tank circulated a portion of the water/steam-pigment mixture to a heat exchanger and from the exchanger into the top of the condenser. Once the holding tank was approximately one-third to one-half full, dilute condensate was bled from the hot side of the heat exchanger to a separate product holding tank.

Using the above-described process, sufficient dilute condensate slurry at about 40% solids was generated to provide a suitable feed to a VSEP® concentration unit manufactured by NEW LOGIC RESEARCH INC., 1295 Sixty Seventh Street, Emeryville, Calif. 94608 and described more fully below. The titanium dioxide fed to the micronizer in this first example was in-process TRONOX™ CR-813 titanium dioxide, an interior architectural paint grade produced by Kerr-McGee Chemical LLC. The feed was obtained from routine commercial production after the surface treatment had been applied, followed by washing and drying, but prior to the final micronization step.

For generating the condensate slurry in this Example, 125 lbs/hour of superheated steam along with approximately 90 lbs/hour of titanium dioxide were metered into the micronizer system, for a weight/weight ratio of about 1.4:1 steam to pigment. Solids levels in the slurry discharging to the product holding tank were monitored at fixed time intervals until a solids level of about 40% by weight was obtained.

Prior to concentrating a sample of the 40% solids condensate slurry in the VSEP apparatus, a calculated amount on a weight/weight basis of a commercial blend of dispersants was added to a known quantity of condensate slurry. The slurry was pre-screened through a 200 mesh sieve to remove any oversize material prior to being fed to the VSEP unit. A VSEP Series L/P unit operated in Single Membrane mode with a 0.1μ pore size Teflon membrane was used. The slurry was re-circulated through the VSEP unit until the solids level ranged between 65 and 66%.

COMPARATIVE EXAMPLE

The second example was carried out to serve as a control and to demonstrate the advantage of the present invention over existing art. Using an identically-sized micronizer to that used in Example 1, a quantity of dry micronized pigment was generated. The micronizer arrangement for this second example was such that it allowed for the micronized pigment to be separated from the superheated steam without any increase in the moisture content of the finished pigment, in keeping with the existing art methods. Separation of the pigment from the steam was for this Comparative Example achieved through the use of a series of cyclones providing approximately 85–90% recovery of the pigment fed to the micronizer. Steam and pigment flow-rates along with steam temperature were identical to those used in Example 1. The pigment used was the same starting pigment also described in Example 1.

Next, using a torque sensing-capable DISPERMAT™ Model M AE3C available from Byk-Gardner, U.S.A., finished slurry was made from the above micronized pigment. The technique involved adding 775 grams of the pigment sample being tested to 370 grams of water along with a quantity of the same propriety dispersant package as used in Example 1, so that after wetting/dispersion the resulting solids level was in the 65 to 66% solids range.

Standard latex paint formulations, designed for interior architectural applications, were made from both the respective high solids slurries of Example 1 and this Comparative Example. The paint formulations were standard latex paint formulations, designed for interior architectural applications. The formulations were formed by incorporating the pigment slurry samples in portions of a freshly prepared polyvinyl acetate latex emulsion. In each formulation, the amount of pigment incorporated into the emulsion was sufficient to provide a 60% pigment volume concentration (in the dry paint film).

The resulting paint formulations were applied to black glass plates and white cards. The Y reflectance values of the dried paint films were measured with a HunterLab Color Difference Meter as known to those skilled in the art. These readings, in combination with measured film weights, were used to calculate the scatter value, expressed as hiding power in square feet per pound of pigment.

Next, a fixed amount of a black tint base was added to each portion of the white latex paint formulation described above (from the slurries of Example 1 and this Comparative Example) to obtain a grey paint to allow tint strength calculations to be made. Drawdowns of these tinted formulations were then made alongside corresponding controls on standard LENETA™ charts. Using all of these drawdowns, both dryhide and tint strength calculations were carried out. The results are shown in Table 1 below.

TABLE 1

Optical Properties of Paint Formulations

| Test Method | Paint made from Example 1's Slurry | Paint made from Comparative Example's Slurry |
|---|---|---|
| Dryhide (Ft$^2$/lb of TiO$_2$) | 219 | 213 |
| Tint Strength | 99.9 | 109.9 |

Pigment slurries made by means of the present invention are thus shown to be quite satisfactory in relation to slurries made by the more complex conventional methods known in the art.

What is claimed is:

1. An apparatus for producing a titanium dioxide slurry, comprising:
 a micronizer that produces an output comprising titanium dioxide and steam;
 a condenser that receives the micronizer output and combines the micronizer output with a first titanium dioxide slurry to condense the titanium dioxide and steam mixture and produces a resulting titanium dioxide slurry.

2. An apparatus for producing a titanium dioxide slurry, comprising:
 a micronizer that produces an output comprising titanium dioxide and steam;
 a condenser that receives the micronizer output and combines the micronizer output with a first titanium dioxide slurry to condense the titanium dioxide and steam mixture and produces a resulting titanium dioxide slurry;
 a storage tank that receives the resulting titanium dioxide slurry and recycles some of the resulting titanium dioxide slurry to the condenser.

3. An apparatus according to claim 1, wherein the micronizer produces an output comprises from about 25 percent to about 50 percent titanium dioxide.

4. An apparatus according to claim 1, wherein the temperature of the micronizer output is at least about 300° F.

5. An apparatus according to claim 1, wherein the temperature of the micronizer output is at least about 400° F.

6. An apparatus according to claim 1, wherein the temperature of the micronizer output is not more than about 600° F.

7. An apparatus according to claim 1, wherein the temperature of the micronizer output is no more than about 500° F.

8. An apparatus according to claim 1, wherein the resulting slurry comprises at least about 40 percent by weight of titanium dioxide.

9. An apparatus according to claim 2, wherein the temperature of the first titanium dioxide slurry is lower than the temperature of the micronizer output.

10. An apparatus according to claim 2, wherein the micronizer output and the first titanium dioxide slurry comprise approximately the same percentage by weight of titanium dioxide.

* * * * *